United States Patent [19]
Barnett

[11] Patent Number: 5,961,830
[45] Date of Patent: Oct. 5, 1999

[54] WASTEWATER TREATMENT METHOD AND PLANT

[76] Inventor: Kenneth Edward Barnett, 307 Maribyrnong Avenue, Kaleen Act 2617, Australia

[21] Appl. No.: 08/836,605

[22] PCT Filed: Nov. 17, 1995

[86] PCT No.: PCT/AU95/00764

§ 371 Date: May 13, 1997

§ 102(e) Date: May 13, 1997

[87] PCT Pub. No.: WO96/15991

PCT Pub. Date: May 30, 1996

[30]     Foreign Application Priority Data

Nov. 18, 1994 [AU]  Australia ................................ PM 9571

[51] Int. Cl.$^6$ ................................................. C02F 3/30
[52] U.S. Cl. ........................ 210/603; 210/605; 210/617; 210/621; 210/151; 210/195.1; 210/221.2; 210/903
[58] Field of Search .................... 210/603, 605, 210/608, 617, 620, 621, 622, 630, 150, 151, 195.1, 195.3, 202, 221.2, 258, 259, 903

[56]           References Cited

U.S. PATENT DOCUMENTS

| | | |
|---|---|---|
| 3,246,885 | 4/1966 | Stevens . |
| 3,390,076 | 3/1968 | Dubach . |
| 3,542,675 | 11/1970 | Mail et al. . |
| 3,574,331 | 4/1971 | Kurosawa et al. . |
| 3,576,738 | 4/1971 | Duffy . |
| 3,617,539 | 11/1971 | Grutsch .................................. 210/608 |
| 3,725,264 | 4/1973 | Wheeler . |
| 3,846,289 | 11/1974 | Jeris et al. ............................. 210/903 |
| 4,009,099 | 2/1977 | Jeris ..................................... 210/151 |
| 4,056,465 | 11/1977 | Spector ................................. 210/903 |
| 4,069,149 | 1/1978 | Jackson . |
| 4,126,544 | 11/1978 | Baensch et al. . |
| 4,279,754 | 7/1981 | Pollock ................................. 210/608 |
| 4,315,821 | 2/1982 | Climenhage ......................... 210/605 |
| 4,430,225 | 2/1984 | Takamatsu et al. ................... 210/608 |
| 4,696,747 | 9/1987 | Verstraete et al. .................... 210/617 |
| 4,948,509 | 8/1990 | Stack .................................... 210/608 |
| 5,075,384 | 5/1991 | Burke ................................... 210/608 |
| 5,437,785 | 8/1995 | Roshanravan ....................... 210/221.2 |
| 5,484,534 | 1/1996 | Edmondson ....................... 210/221.2 |
| 5,516,434 | 5/1996 | Cairo Jr. et al. ................... 210/221.2 |

Primary Examiner—Christopher Upton
Attorney, Agent, or Firm—Rhodes, Coats, & Bennett, LLP

[57]           ABSTRACT

A method of treating wastewater including: biologically treating wastewater under pressure; then reducing the pressure and substantially removing solids by dissolved gas flotation at the reduced pressure.

26 Claims, 1 Drawing Sheet

WASTEWATER TREATMENT METHOD AND PLANT

TECHNICAL FIELD

This invention relates to a wastewater treatment method and plant.

As used herein, the term "wastewater" includes sewage and any other contaminated water. Thus, the treatment plant may be used to treat a range of wastewaters including municipal wastewater and industrial wastewater.

The invention has as one of its aims the recycling of wastewater.

This invention has particular, but not exclusive, application to so-called "water-mining" plants for treatment of wastewater. However, the invention could also be used as an "end of pipe" facility.

The term "water-mining" refers to an approach to wastewater treatment which is fundamentally different to conventional treatments. Traditionally, wastewater has been reticulated from its source to a distant "end of pipe" treatment plant whereat the wastewater is treated and separated into a number of by-products.

One by-product is water of a grade suitable for irrigation, industrial applications and the like. However, this treated water is seldom returned to its origin due to the high cost of reticulation.

The "water mining" approach employs a smaller "community" site-specific plant which is intended to "mine" useable treated water from wastewater originating within a community which can then be used in the community from which the wastewater originates. The recycled water may be potable or may be suitable only for non-potable uses.

It will be appreciated that the water mining approach reduces the demand for the reticulation of water to the community and for the reticulation of wastewater away from the community.

It is envisaged that a number of smaller "community" plants would operate in conjunction with the "end of pipe" treatment plant. In that case, the smaller "community" plants need not be capable of treating the bulk of solids. Rather, solids and any other constituents not readily treatable or removable by the smaller "community" plant can be diverted to the "end of pipe" treatment plant. Alternatively, the community plant might be an "end of pipe" plant in its own right.

Thus, the essence of the "water mining" approach is to mine useable water from wastewater at or adjacent the location from which the wastewater originates. In addition to recycling water, the approach reduces reticulation loads and the loading on the "end of pipe" plant.

Whilst the "water mining" approach is plant intensive, it should be appreciated that the bulk of capital costs associated with a wastewater system resides in the reticulation system.

A "community" plant, as broadly described above, is preferably compact, low maintenance, unobtrusive, remotely controllable, and substantially odourless. Most preferably, it is modular and requires little site preparation.

BACKGROUND ART

Conventional modern wastewater treatments systems usually involve some form of biological nitrification and denitrification to remove ammonia from the wastewater.

In the nitrification stage, ammonia is reacted with oxygen to produce oxides of nitrogen, particularly nitrates. In the denitrification stage, the oxides of nitrogen are broken down to their constituent elements in the absence of oxygen.

Conventional wastewater treatments systems are large and do not address the requirements of a plant suitable for water mining.

DISCLOSURE OF THE INVENTION

In one aspect the invention resides in a method of treating wastewater including:

biologically treating wastewater under pressure; then reducing the pressure and employing the pressure reduction to substantially remove solids by dissolved gas flotation.

The biological treatment is accelerated by the high partial pressure of oxygen whilst the subsequent pressure reduction can be synergistically employed to clarify the biologically treated wastewater.

Preferably, the method further includes:

further reducing the pressure and employing the further reduction in pressure to drive a filtration and/or disinfection process.

Preferably, the biological treatment under pressure includes:

adding oxygen and biologically nitrifying wastewater under pressure to substantially remove ammonia.

Preferably also, the biological treatment under pressure further includes:

biologically deoxidising wastewater under pressure to substantially remove dissolved oxygen; and biologically denitrifying the deoxidised wastewater under pressure to substantially remove soluble oxidised nitrogen.

Alternatively, the pressurised biological treatment may be totally aerobic for BOD removal only.

Preferably, the method further includes:

recirculating a portion of the nitrified wastewater for mixing with wastewater and further biological treatment under pressure.

In the preferred embodiment the biological treatment occurs in a fluidised bed biological reactor.

In another aspect the invention resides in a wastewater treatment plant including:

pressurised biological treatment means; and pressure reduction means for receiving wastewater treated by the pressurised biological treatment means, the pressure reduction means constituting a dissolved gas flotation unit for clarifying the treated water.

Preferably, the plant includes further pressure reduction means, the further pressure reduction means being a filter.

Preferably, the pressurised biological treatment means includes nitrifying means for biologically nitrifying wastewater under pressure to substantially remove ammonia and oxygen addition means for adding oxygen into the nitrifying means.

Preferably also, the pressurised biological treatment means further includes:

deoxidising means for biologically deoxidising wastewater under pressure to substantially remove dissolved oxygen; and denitrifying means for biologically denitrifying the deoxidised wastewater under pressure to substantially remove soluble oxidised nitrogen.

Alternatively, the pressurised biological treatment means may be totally aerobic for BOD removal only.

In the preferred embodiment the plant further includes:

recirculating means for recirculating a first portion of the nitrified wastewater.

Preferably, the nitrifying means is a fluidised bed reactor.

Preferably, the pressure reduction means is a surge tank.

Preferably, the plant further includes tertiary treatment means at a further reduced pressure for further treatment of the second portion of the nitrified wastewater.

In another aspect the invention resides in a site specific wastewater treatment plant including:

inlet means for receiving wastewater from a site;

deoxidising means for biologically deoxidising the wastewater to substantially remove dissolved oxygen;

denitrifying means for biologically denitrifying the deoxidised wastewater to substantially remove soluble oxidised nitrogen;

oxygen addition means for adding oxygen and nitrifying means for biologically nitrifying the denitrified wastewater under pressure to substantially remove ammonia;

pressure reduction means for reducing the pressure of at least a portion of the nitrified wastewater for solids removal by dissolved air flotation; and outlet means for returning treated water to the site.

In another aspect the invention resides in a wastewater treatment plant including: mixing means for mixing wastewater with recirculated nitrified wastewater;

deoxidising means for biologically deoxidising the mixture of wastewater and recirculated nitrified wastewater to substantially remove dissolved oxygen;

denitrifying means for biologically denitrifying the deoxidised wastewater to substantially remove soluble oxidised nitrogen;

oxygen addition means for adding oxygen and nitrifying means for biologically nitrifying the denitrified wastewater under pressure to substantially remove ammonia;

recirculation means for recirculating a portion of the nitrified wastewater to the mixing means; and pressure reduction means for reducing the pressure of another portion of the nitrified wastewater for solids removal by dissolved air flotation.

BRIEF SUMMARY OF THE FIGURE

In order that this invention may be more easily understood and put into practical effect, reference will now be made to the accompanying drawing which illustrates a preferred embodiment of the invention, wherein.

Figure 1:
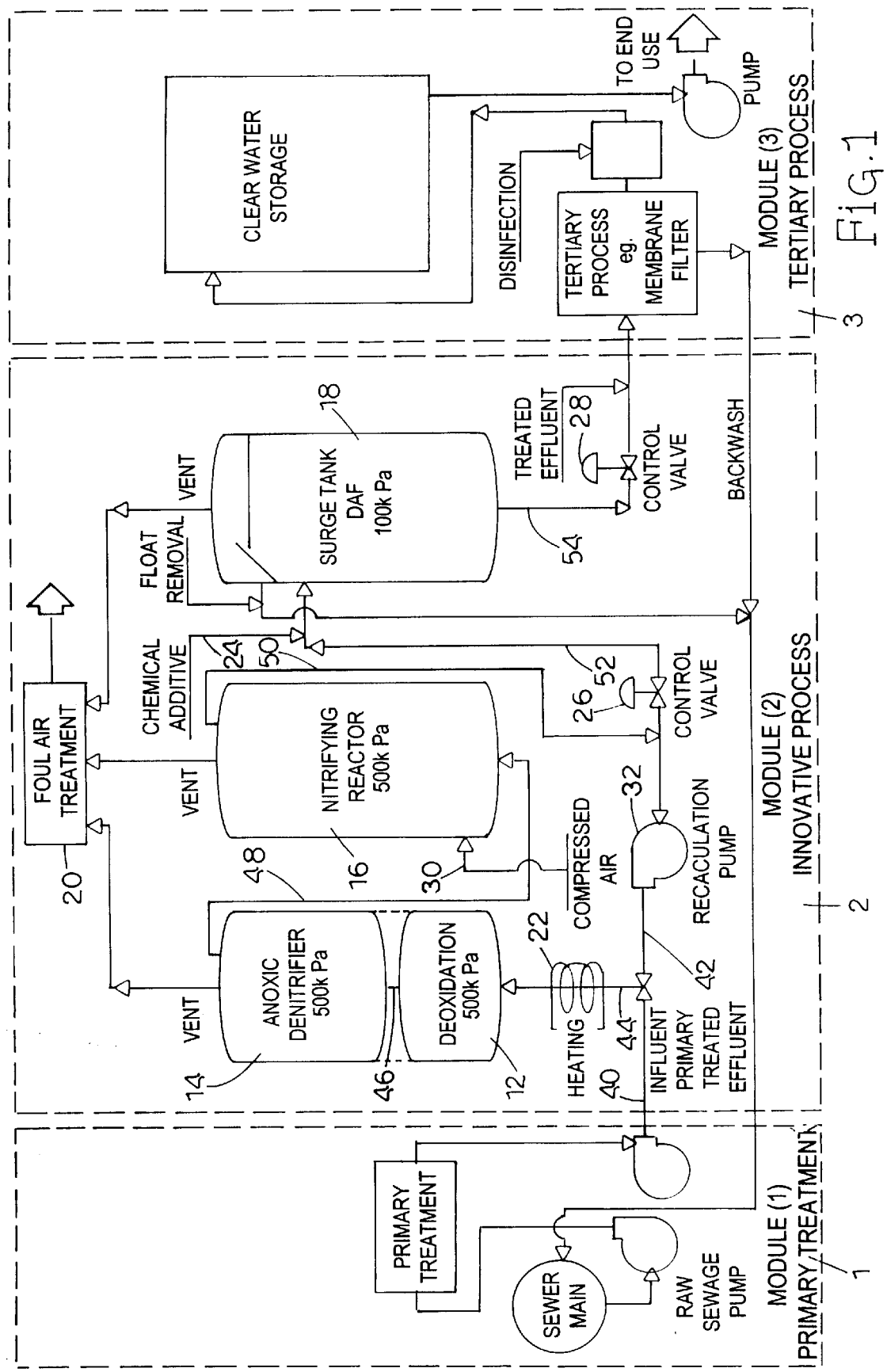
FIG. 1 is a schematic illustration of a wastewater treatment method and plant in accordance with the invention being used in a municipal environment.

In order to place the innovative aspects of the present invention in perspective, a primary treatment labelled as "Module 1" and a tertiary treatment labelled as "Module 3" are included.

BEST MODE

The primary treatment involves uptake of wastewater and primary processing (eg sedimentation, screening) in the conventional manner. Primary treated wastewater is then pumped to "Module 2" for secondary treatment.

The tertiary treatment involves filtration by conventional means, e.g. granular bed or membrane filtration, and disinfection. The filter may be periodically backwashed with the backwash being returned to the wastewater main.

Referring now to "Module 2", the preferred embodiment of the invention comprises three pressurised biological reactors 12, 14, 16 and reduced pressure means 18 in the form of a surge tank. It will be understood that there may be any number of biological reactors and they need not all be pressurised.

Wastewater flow 40, which is primary treated wastewater from "Module 1" is mixed with recirculated nitrified wastewater flow 42 to form combined flow 44 which is fed into deoxidation means 12. Deoxidation means 12 takes the form of a fluidised bed biological reactor which is operated at a pressure of between 0 to 1000 kpa, and preferably 500kpa.

The temperature of the wastewater at various points in the system may be controlled by heating means 22. Whilst heating means 22 is schematically illustrated as an induction coil, it can take any form, e.g. heated reactor jacket, and can be located at any point or points of the system.

Combined flow 44 is fed to deoxidation means 12 where dissolved oxygen is biologically stripped from combined flow 44 so that the level of dissolved oxygen in exiting flow 46 is effectively zero. The biochemical oxygen demand of the wastewater is also reduced whilst ammonia and soluble oxidised nitrogen levels are essentially unchanged relative to flow 44. The soluble oxidised nitrogen is primarily nitrate, however some nitrite may also be present.

Flow 46 is introduced to denitrifying means 14 which takes the form of a fluidised bed biological reactor which also operates at a pressure of between 0 to 1000 kpa, and preferably 500 kpa.

Deoxidation and denitrification may occur in a single reactor (refer to dotted line extending between reactors 12 and 14).

Denitrifying means 14 biologically converts soluble oxidised nitrogen (primarily nitrate) to gaseous nitrogen, some of which is vented to foul air treatment 20 but most of which is retained in solution.

Exiting flow 48 has soluble oxidised nitrogen and dissolved oxygen levels of essentially zero whilst biochemical oxygen demand has been reduced marginally and the ammonia level remains essentially unchanged relative to flow 46.

Flow 48 is fed to nitrifying means 16 which takes the form of fluidised bed biological reactor which is maintained at a pressure of between 0 to 1000 kpa, and preferably 500 kpa. Oxygen in the form of compressed air 30 is injected into nitrifying means 16. Due to the elevated pressure of the nitrifying means, the introduced air is largely dissolved. Pure oxygen could also be used.

Nitrifying means 16 converts ammonia to soluble oxidised nitrogen so that the exiting flow 50 has ammonia and biochemical oxygen demand levels of essentially zero whilst soluble oxidised nitrogen and dissolved oxygen levels have been raised. Any non-dissolved gases may be vented to foul air treatment 20.

Exiting flow 50 is divided into recirculated flow 42 and flow 52 which is fed to reduced pressure means 18 in the form of a surge tank.

Phosphorous removal from flow 52 is achieved by chemical addition at point 24.

The proportion of wastewater which is recirculated is controlled to achieve desired performance. It is anticipated that the ratio of flow 40 to flow 42 will be of the order of 1:1 to 1:2.

Pressure reduction means 18 is operated at a pressure of 0–200 kpa (preferably 100 kpa) and accordingly the bulk of the dissolved gases in flow 52 come out of solution. In this regard, the pressure reduction means has a pressurised gas space above the liquid. Solids are removed by dissolved air flotation which occurs due to the reduced pressure. That is, bubbles are formed which bond to solids and float them the top of the pressure reduction means whereat they are removed and returned to the wastewater main. Pressure reduction means 18 conveniently takes the form of a surge tank to accomodate flow variations during backwashing of tertiary filters.

Flow 54 is removed from pressure reduction means 18 and passed via control valve 28 to the tertiary process.

It will be recalled that pressure reduction means 18 operates at a pressure 100 kpa. Accordingly, the tertiary process (filtration) may be driven by a further pressure reduction. For example, the downstream side of the filtration may be at ambient pressure. Subsequent to filtration, the treated wastewater is disinfected and stored prior to end use.

The following is given by way of example only and is based on the ratio of flow 40 to flow 42 being 1:1. The actual ratio and actual values may vary. NOTE: All measurements are in milligrams per litre.

|  | AMMONIA | NITRATE | BIOCHEM OXYGEN DEMAND | DISSOLVED OXYGEN |
|---|---|---|---|---|
| Composition of Flow 40 | 30 | 0 | 150 | 0 |
| Composition of Flow 42 | 0 | 15 | 10 | 40 |
| Composition of Flow 44 | 15 | 7.5 | 80 | 20 |
| Composition of Flow 46 | 15 | 7.5 | 60 | 0 |
| Composition of Flow 48 | 15 | 0 | 50 | 0 |
| Composition of Flow 50 | 0 | 15 | 10 | 40 |

The process according to the preferred embodiment provides advantages over more conventional wastewater treatment processes by providing for both pressure and temperature control which can help optimise treatment. It will reduce residence time whilst achieving high quality wastewater effluent, featuring enhanced nitrification and improved phosphorous removal capacity. It also produces substantially lower sludge yield with low organic content more suitable for direct horticultural use. It also features virtual elimination of odours due to containment in vessels which can be vented to foul air treatment.

The combination of reduced residence time, high wastewater effluent quality, enhanced solids removal without the need for back wash, substantially lower sludge yield with lower organic content and superior odour control are factors of commercial significance. Much smaller construction will be required when compared to more conventional process systems. This will have application in urban and select industrial environments particularly those exhibiting spatial or aesthetic constraints. Smaller construction also lends itself to modularity and decreases site preparation requirements.

One feature of this preferred system is the use of fluidised beds for the biological reactors. Fluidised beds employ small granular media upon which biomass is established. The effective concentration of biomass reaches very high levels because of the many thousands of discrete particles present in the bed. The wastewater flows up through the bed and the bed is fluidised either due to the velocity of the wastewater flow itself or with assistance from air in aerobic systems. The fluidisation of the bed results in extremely good contact of the wastewater with the media biomass. Further, the abrasive nature of a fluidised bed inhibits clogging growth and facilitates desirable thin biofilms on the granular media.

It is important that the biofilm thichness remains controlled. In this regard, if biofilm growth is unchecked, the granular media particles increase in size and accordingly the drag forces on the particles increase. The fluidisation of the bed of particles can be excessive and the bed can expand and overflow from the reactor.

The present system uses secondary and tertiary biofilm control to control biofilm growth. The secondary biofilm control takes the form of gas (preferably air) scours which are capable of knocking excess biofilm growth off particles. The tertiary biofilm control, which may be an impellor pump, inducts particles and mechanically abrades them before returning them.

It is estimated that the concentration of biomass in fluidised beds is approximately ten times that of concentration fixed growth reactors or suspended growth systems. Hence, much higher volumetric loadings can be achieved.

A second feature of the preferred system is the use of pressurised reactors to enhance biological activity, in particular nitrification. (Nitrification is the conversion of ammonia to soluble oxidised nitrogen whilst denitrification is the conversion of soluble oxidised nitrogen to gaseous nitrogen). It has been demonstrated that operation of a biofilm under a pressurised atmosphere increases the rate of nitrification by approximately 2.5 to 3 times in comparison with operation at atmospheric pressure. Given that the size of a biological reactor designed for nitrification is normally controlled by the nitrification requirement rather than by the biochemical oxygen demand removal equipment (due to soluble organic carbon contaminants), this concept has significant implication in reactor sizing. Furthermore, reactor pressurisation may result in improved removal of less readily biodegradable soluble organics (such as surfactants) due to the higher oxidation levels achievable in a pressurised system.

The reason for improved nitrification under pressure is most likely due to the dependance of the rate of growth of nitrifying organisms on dissolved oxygen concentration. The saturation concentration of oxygen is dependant on the absolute partial pressure of oxygen in the surrounding atmosphere. By pressurising a reactor through which air is flowing, the absolute partial pressure of oxygen is increased and thereby the saturation dissolved oxygen concentration is raised. At five atmospheres pressure, the maximum dissolved oxygen concentration would be approximately 50 milligrams per litre, which is five times that at one atmosphere.

Operation of the biological reactor system under pressure will have an inherent synergistic advantage in that the depressurisation reactor (reduced pressure means), which must follow to reduce the pressure prior to tertiary process treatment such as membrane microfiltration, will in effect perform as a dissolved air flotation unit. Oxygen and nitrogen gas (and any other gases) dissolved in the wastewater stream at high pressure in the biological reactor system will come out of solution as the pressure is reduced. The effect is excellent clarification of the wastewater and removal of solids prior to tertiary processes such as membrane microfiltration, which should reduce the solids loading on such processes and hence further enhance performance. Adequate depressurisation reactor pressure retention also has the benefit of being able to drive the tertiary process.

The influence of temperature on microbiological activities is well known, but only selectively applied in conventional wastewater application. However, the benefit of temperature control can be important in optimising process performance behaviour.

The construction of biological reactors operating under pressure with some temperature control is significant in reducing the size of biological reactors. Furthermore, the potential for odour generation by the process is low because the system inherently requires a smaller process airflow rate, and therefore the amount of potentially odorous off-gas that is produced would be smaller than for conventional processes such as the aerated biofilter. The process requires less air because of the high oxygen transfer rate that can be achieved at the higher operating pressures. Furthermore, as noted previously, the containment of the process in pressurised reactors enables controlled venting to foul air treatment.

An advantage, when the invention utilises fluidised bed reactors, is the elimination of the back wash requirement which can involve significant storage volume and loss of productive capacity. In this regard, fluidised beds do not act as filters in the manner that other systems do and accordingly need not be backwashed to clear build-up.

The performance of the preferred system can also be varied by varying the amount of recirculation. In this regard, the ratio of flow 40 to flow 42 largely determines the extent to which nitrogen is removed.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

The claims defining the invention are as follows:

1. A method of nitrifying and denitrifying wastewater under pressure comprising:
    a. directing wastewater into a pressurized aerobic zone and biologically nitrifying the wastewater under pressure so as to convert ammonia to soluble oxidized nitrogen;
    b. transferring at least a portion of the nitrified wastewater from the pressurized aerobic zone to a pressurized deoxygenation zone;
    c. deoxidizing the wastewater under pressure within the pressurized deoxygenation zone so as to substantially remove dissolved oxygen from the wastewater;
    d. transferring the deoxidized wastewater from the pressurized deoxygenation zone to a pressurized anoxic zone; and
    e. biologically denitrifying the wastewater in the anoxic zone under pressure by biologically converting the soluble oxidized nitrogen contained in the wastewater to gaseous nitrogen.

2. The method of claim 1 wherein the pressurized treatment of wastewater in the deoxygenation, anoxic and aerobic zones includes passing the wastewater through a fluidized bed contained within the respective pressurized zones.

3. The method of claim 1 including maintaining the pressure within each of the zones at a pressure of at least 100 kPa.

4. The method of claim 1 including maintaining the pressure within selected zones of the process at pressures of at least 25 kPa.

5. The method of claim 1 including heating the wastewater at a selected point in the treatment process.

6. The method of claim 5 including heating the wastewater prior to the wastewater entering the pressurized deoxidation zone.

7. The method of claim 1 including reducing the dissolved oxygen in the wastewater to effectively zero in the pressurized deoxygenation zone.

8. The method of claim 1 including directing at least a portion of the nitrified wastewater from the pressurized aerobic zone to a pressurized solids separation zone and therein subjecting the wastewater to a pressure less than the pressure present in the nitrification zone.

9. The method of claim 8 including driving an associated tertiary process by subjecting the wastewater to a pressure that is less than the pressure experienced in the solids separation zone.

10. The method of claim 8 including mixing a chemical composition with the wastewater for removing phosphorus at a point downstream from the pressurized nitrification zone.

11. The method of claim 1 including driving an associated tertiary process by subjecting the wastewater to a pressure that is less than the pressure experienced in the nitrification and denitrification phase of the wastewater treatment process.

12. The method of claim 1 including driving an associated filtration and/or disinfection process by subjecting the wastewater to a pressure that is less than the pressure experienced in the nitrification and denitrification phase of the wastewater treatment process.

13. The method of claim 1 including directing an oxygen containing gas into the pressurized nitrification zone and aerating the wastewater under pressure with the oxygen containing gas.

14. A method of nitrifying and denitrifying wastewater under pressure comprising:
    a. directing an ammonia containing stream of wastewater into a secondary treatment area;
    b. directing the wastewater into a pressurized nitrification reactor and maintaining the wastewater therein under pressure while aerating the wastewater and biologically converting ammonia to nitrate and/or nitrite; and
    c. directing the wastewater containing nitrate and/or nitrite to a pressurized denitrification reactor and maintaining the wastewater under pressure and anoxic conditions therein while biologically converting the nitrate and/or nitrite to a gaseous nitrogen.

15. The method of claim 14 including maintaining the pressure within the pressurized aerobic and anoxic reactors at a pressure level of at least 25 kPa and above.

16. The method of claim 14 including maintaining the pressure within the pressurized aerobic and anoxic reactors at a pressure level of at least approximately 200 kPa and above.

17. The method of claim 16 including maintaining the pressure within the pressurized anoxic and aerobic reactors at a level of approximately 500 kPa.

18. The method of claim 16 including directing the wastewater through a fluidized bed in each of the pressurized reactors during the nitrification and denitrification process.

19. The method of claim 14 including directing the denitrified wastewater to a clarification unit housed within a chamber that is maintained at a pressure below the pressure level within the anoxic and aerobic reactors.

20. A pressurized biological wastewater treatment plant for nitrifying and denitrifying wastewater comprising:
    a. a pressurized deoxidation reactor for receiving wastewater influent and reducing the dissolved oxygen concentration within the wastewater;
    b. a pressurized anoxic reactor located downstream from the pressurized deoxidation reactor for receiving wastewater from the deoxidation reactor and biologically denitrifying the wastewater under pressure such that soluble oxidized nitrogen in the form of nitrates and/or nitrites are converted to gaseous nitrogen;

c. a pressurized aerobic reactor located downstream from the pressurized anoxic reactor for biologically nitrifying wastewater under pressure such that ammonia contained within the wastewater is converted to soluble oxidized nitrogen in the form of nitrates and/or nitrites; and d. a return line leading from the pressurized nitrification reactor for routing a selected amount of nitrified wastewater to the deoxidation reactor.

21. The pressurized wastewater plant of claim 20 further including a clarifying unit for receiving treated wastewater from at least one of the reactors and subjecting the treated wastewater to a reduction in pressure relative to the pressure experienced in the nitrification and denitrification reactors.

22. The pressurized wastewater treatment plant of claim 21 wherein the clarifying unit is at least partially contained in a surge tank.

23. The pressurized wastewater treatment plant of claim 20 including means for injecting an oxygen containing gas into the pressurized aerobic zone.

24. The pressurized wastewater treatment plant of claim 20 wherein at least one of the pressurized reactors includes a fluid bed through which the wastewater passes.

25. The pressurized wastewater plant of claim 20 wherein the pressurized anoxic and aerobic reactor are pressurized to a pressure level of at least approximately 25 kpa.

26. The pressurized nitrification-denitrification wastewater treatment plant of claim 20 wherein the pressurized anoxic and aerobic reactors are pressurized to a pressure level of at least 200 kpa.

* * * * *